United States Patent
Lee et al.

(10) Patent No.: US 6,880,122 B1
(45) Date of Patent: Apr. 12, 2005

(54) SEGMENTING A DOCUMENT INTO REGIONS ASSOCIATED WITH A DATA TYPE, AND ASSIGNING PIPELINES TO PROCESS SUCH REGIONS

(75) Inventors: Jeffrey P Lee, Greeley, CO (US); Steven J Simske, Greeley, CO (US); Julie T Dawe, Ft Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 4 days.

(21) Appl. No.: 09/311,254

(22) Filed: May 13, 1999

(51) Int. Cl.⁷ .............................................. G06F 15/00
(52) U.S. Cl. ...................... 715/500; 715/520; 715/521; 380/176
(58) Field of Search ........................ 715/500, 517–521; 382/176, 180; 707/500, 517–521

(56) References Cited

U.S. PATENT DOCUMENTS

| | | | | | |
|---|---|---|---|---|---|
| 4,484,349 A | * | 11/1984 | McCubbrey | ................ | 382/308 |
| 5,396,616 A | * | 3/1995 | Venable | ........................ | 703/27 |
| 5,530,907 A | * | 6/1996 | Pavey et al. | ................... | 710/69 |
| 5,555,362 A | | 9/1996 | Yamashita et al. | | |
| 5,557,795 A | * | 9/1996 | Venable | ........................ | 703/23 |
| 5,701,479 A | * | 12/1997 | Venable | ........................ | 703/23 |
| 5,764,866 A | * | 6/1998 | Maniwa | ...................... | 358/1.15 |
| 5,822,454 A | * | 10/1998 | Rangarajan | ................. | 382/176 |
| 5,848,184 A | * | 12/1998 | Taylor et al. | ................ | 382/173 |
| 5,893,127 A | * | 4/1999 | Tyan et al. | ................... | 382/176 |
| 5,995,996 A | * | 11/1999 | Venable | ........................ | 709/100 |
| 5,999,664 A | * | 12/1999 | Mahoney et al. | ............ | 382/180 |
| 6,078,697 A | * | 6/2000 | Ng | .............................. | 382/275 |
| 6,088,480 A | * | 7/2000 | Sakamoto | ..................... | 382/180 |
| 6,163,623 A | * | 12/2000 | Ohta | ........................... | 382/176 |
| 6,252,614 B1 | * | 6/2001 | Mullin | ........................ | 345/560 |
| 6,415,306 B2 | * | 7/2002 | Seaman | ....................... | 345/634 |
| 6,446,099 B1 | * | 9/2002 | Peairs | ........................... | 707/3 |
| 6,674,901 B1 | * | 1/2004 | Simske et al. | .............. | 382/180 |
| 6,731,800 B1 | * | 5/2004 | Barthel et al. | .............. | 382/176 |
| 6,735,740 B2 | * | 5/2004 | Sakai et al. | ................. | 715/526 |

FOREIGN PATENT DOCUMENTS

| EP | 0415373 A2 | 3/1991 |
|---|---|---|
| EP | 0629078 A1 | 12/1994 |
| EP | 0753833 A1 | 1/1997 |
| EP | 0461760 B1 | 4/1999 |

OTHER PUBLICATIONS

Ulead PhotoImpact 3.0 User Guide, Ulead Systems (1996, pp. 90–92, 162–172).*

* cited by examiner

Primary Examiner—Cesar B Paula

(57) ABSTRACT

Disclosed is a selective document processing system and method. The selective document processing system includes a digital document analyzer configured to determine a number of regions on a digital document and a data type for each of the regions, the data type for each region being one of a number of predefined data types. The system also includes a first user interface to display the analyzed digital document and to allow the user to perform various functions relative to the displayed digital document including selecting desired regions, deleting regions, etc. The system also includes a selection interface activated from the first user interface for identifying at least one of the predefined data types that are displayed on the first user interface and that are further processed in predetermined processing pipelines.

18 Claims, 4 Drawing Sheets

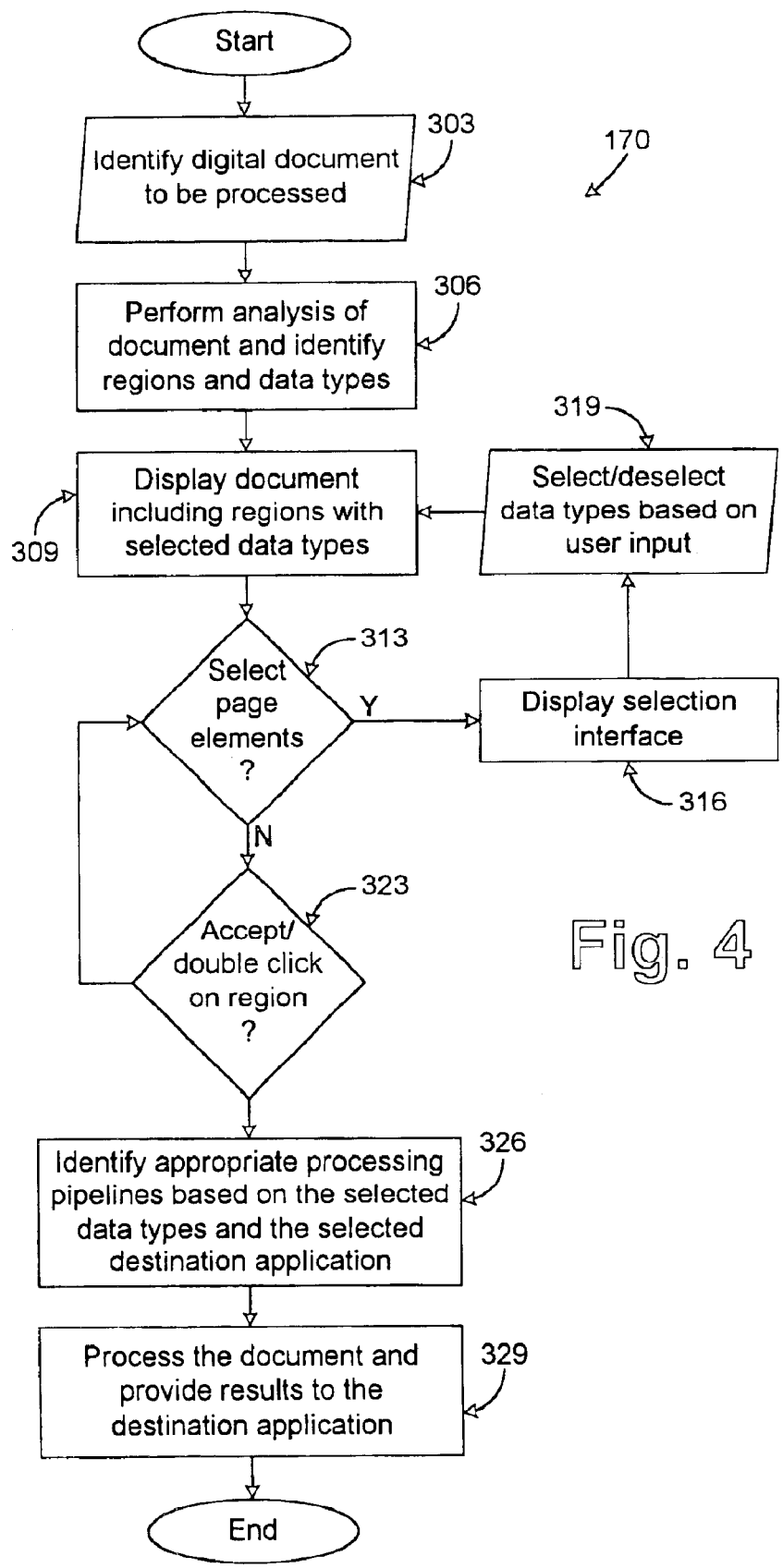

SEGMENTING A DOCUMENT INTO REGIONS ASSOCIATED WITH A DATA TYPE, AND ASSIGNING PIPELINES TO PROCESS SUCH REGIONS

TECHNICAL FIELD

The present invention is generally related to document processing and, more particularly, is related to a selective document processing system and method to selectively control the processing of information on documents and the like.

BACKGROUND OF THE INVENTION

More and more documents are generated using word processors and the like and are stored on memory devices, such as hard drives, floppy disks, compact disks and other mass storage media. Nonetheless, paper and other similar media will continue to be used far into the future. Consequently, there will continually be a need to scan the substance portrayed on such media so that such information may be manipulated on a computer or other like device.

However, the scanning of paper documents to make the content thereon available in a digital environment may be time consuming and costly. In particular, one problem is that the processing of various regions of scanned documents may take a long time requiring the user to wait for the processing of a whole document. Oftentimes, a user may only want to access a portion of the text, artwork, or other region of the scanned document, rather than the entire document such as cases where specific paragraphs of text are sought from a document. However, current users are often forced to wait while scan converter technology analyzes an entire document to determine the specific types of the various regions that may then be processed by various processing pipelines such as optical character recognition pipelines, etc.

SUMMARY OF THE INVENTION

To address the above stated problems, the present invention provides for a selective document processing system and method. In one embodiment, the selective document processing system includes a digital document analyzer configured to determine a number of regions on a digital document and a data type for each of the regions, the data type for each region being one of a number of predefined data types. The system also includes a first user interface to display the analyzed digital document and to allow the user to perform various functions relative to the displayed digital document including selecting desired regions, deleting regions, etc. The system also includes a selection interface activated from the first user interface for identifying at least one of the predefined data types that are displayed on the first user interface for viewing and further processing in predetermined processing pipelines.

The present invention can also be viewed as providing a method for controlling document region analysis. In this regard, the method can be broadly summarized by the following steps: analyzing a digital document to determine a number of regions thereon and a data type for each of the regions, the data type for each region being one of a number of predefined data types; and, identifying at least one of the predefined data types for further processing.

The present invention includes various advantages such as providing the user with more efficient document processing as unwanted data types need not be manually eliminated by simply selecting only desired data types in the selection interface or by manually deleting unwanted data types. This is especially the case for mass document processing in which only specific data types are sought from a number of documents that are consecutively processed. Also, the user is spared the difficulty of viewing a digital document on the first user interface that may be cluttered with unwanted data types. The present invention is also simple in design, user friendly, robust, reliable, and efficient in operation, and easily implemented for mass commercial production.

Other features and advantages of the present invention will become apparent to one with skill in the art upon examination of the following drawings and detailed description. It is intended that all such additional features and advantages be included herein within the scope of the present invention.

BRIEF DESCRIPTION OF THE SEVERAL VIEWS OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 4 is a flow chart of selective processing logic stored and executed by the selective document processing system of FIG. 1.

DETAILED DESCRIPTION

Figure 1:
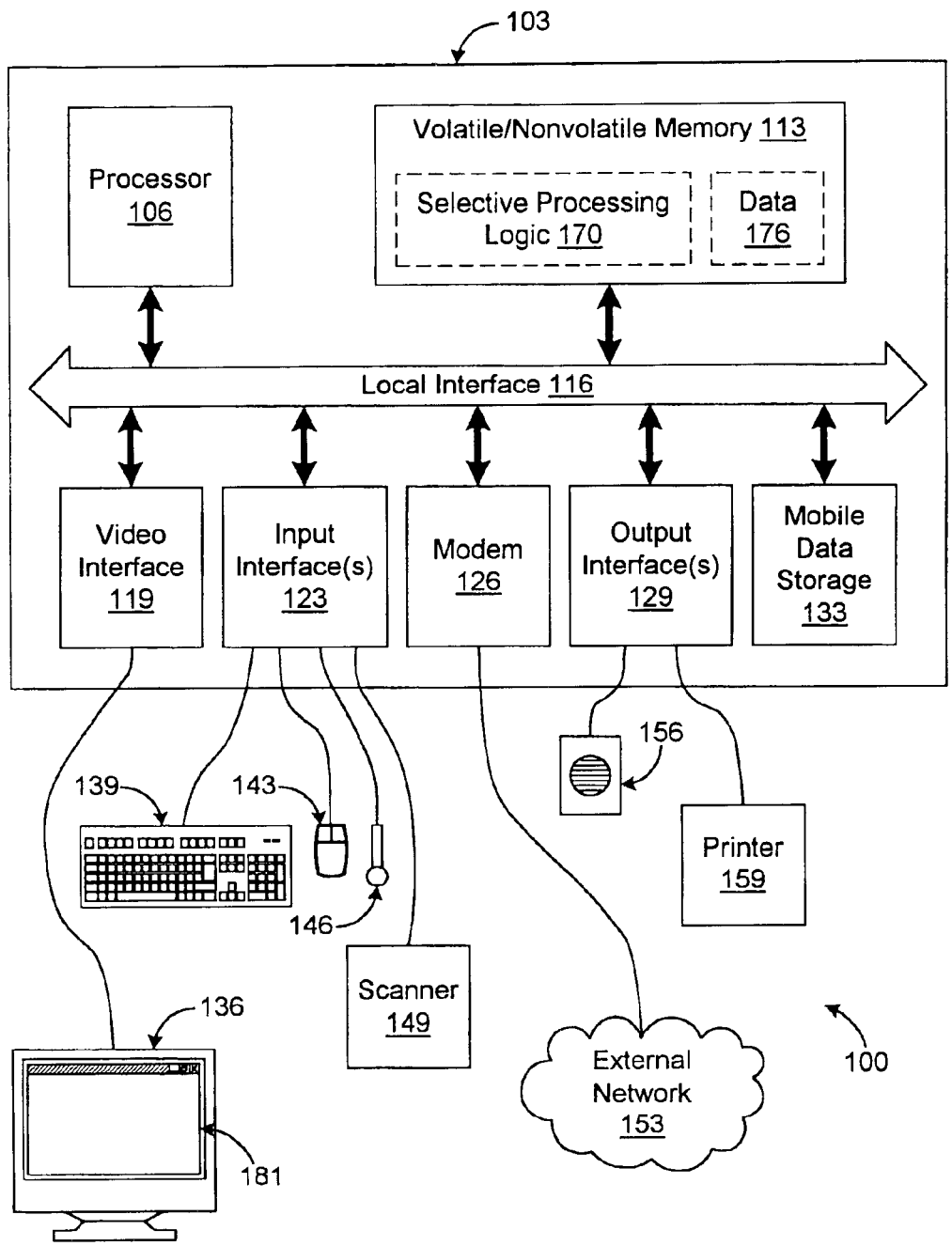
FIG. 1 is a block diagram of a selective document processing system according to an embodiment of the present invention.

Referring to FIG. 1, shown is a block diagram of a document processing system 100 according to an embodiment of the present invention. The selective document processing system 100 includes a computer system 103 which comprises a processor 106, and a volatile/nonvolatile memory 113, both of which are coupled to a local interface 116. The local interface 116 comprises, for example, a data bus and a control bus, or other like structure. The computer system 103 further comprises a video interface 119, a number of input interfaces 123, a modem 126, a number of output interfaces 129, and a mobile data storage device 133, all of which are also coupled to the local interface 116. The memory 113 may include, for example, a random access memory (RAM), a read only memory (ROM), a hard drive, and other like devices, or any combination of these devices. Note that the term volatile refers to memory devices that generally lose data stored therein upon loss of power, and nonvolatile refers to memory devices that do not lose data upon loss of power.

The selective document processing system 100 also includes a display device 136 that is coupled to the local interface 116 via the video interface 119. The display device may be, for example, a cathode ray tube (CRT), a liquid crystal display (LCD), or other similar display device. The system 100 also includes several input devices, namely, a keyboard 139, a mouse 143, a microphone 146, and a scanner 149 that are all coupled to the local interface 116 via the various input interfaces 123. In addition, the modem 126 is coupled to an external network 153 thus allowing the computer system to send and receive data via the external network 153. The external network 153 may be, for example, the Internet, local area network (LAN), wide area network (WAN), or other similar network.

The selective document processing system 100 may further include audio speakers 156, a printer 159, or other output devices that are coupled to the local interface 116 via the output interfaces 129. The mobile data storage device 133 may be one of several such devices that allow storage of data on a mobile platform such as a floppy disk drive, compact disc drive, mobile hard drive, mobile fixed memory, or other similar data storage device.

The selective document processing system 100 also includes selective processing logic 170 that is generally stored on the memory 113 along with data 176. In one embodiment of the present invention, the memory 113 comprises a combination of RAM, ROM, and a hard drive, although other combinations may be used. In one embodiment, the selective processing logic 170 is software that is stored on the hard drive and the data 176 is also stored on the hard drive. When the selective document processing system 100 is operational, pertinent portions of the selective processing logic 170 are loaded into the RAM and are executed by the processor 106. During operation of the selective document processing system 100, the selective processing logic 170 may access pertinent portions of the data 176 stored on the hard drive, loading them into the RAM for various purposes. For example, the data 176 may comprise a digital document such as a bit map image of a scanned document received from the scanner 149. The data 176 may also be accessed via the mobile data storage 133 or the external network 153.

The display device 136 is employed to display any one of a number of user interfaces 181 that are viewed by the user. The user may also interface with the computer system 103 via the input devices such as the keyboard 139, mouse 143, microphone 146, or other input devices. The user receives audio output from the audio speakers 156 and the computer system 103 may print out various documents created on the printer 159.

Note that although the above implementation of the present invention is discussed in terms of a processor circuit and software, it is understood that other embodiments of the present invention include a dedicated logical circuit that accomplishes the functionality of the selective processing logic 170, or a combination circuit which includes a processor circuit with software and specific dedicated circuits. It is understood that all such permutations of various implementations are included herein.

The selective document processing system 100 advantageously provides a flexible system for processing digital documents received via the scanner 149, external network 153, mobile data storage 133, or stored in the memory 113. In processing the digital documents, the system 100 identifies one or more regions on the digital document that comprise uniform information such as a specific text, artwork, or a photo, etc. Thereafter, the regions are applied to appropriate processing pipelines according to specific criteria discussed later in detail. The processing pipelines may comprise, for example, optical character recognition or photo processing algorithms. The resulting processed regions are then recombined and dumped into a desired destination application that may be, for example, a word processor, or other similar application.

Figure 2:
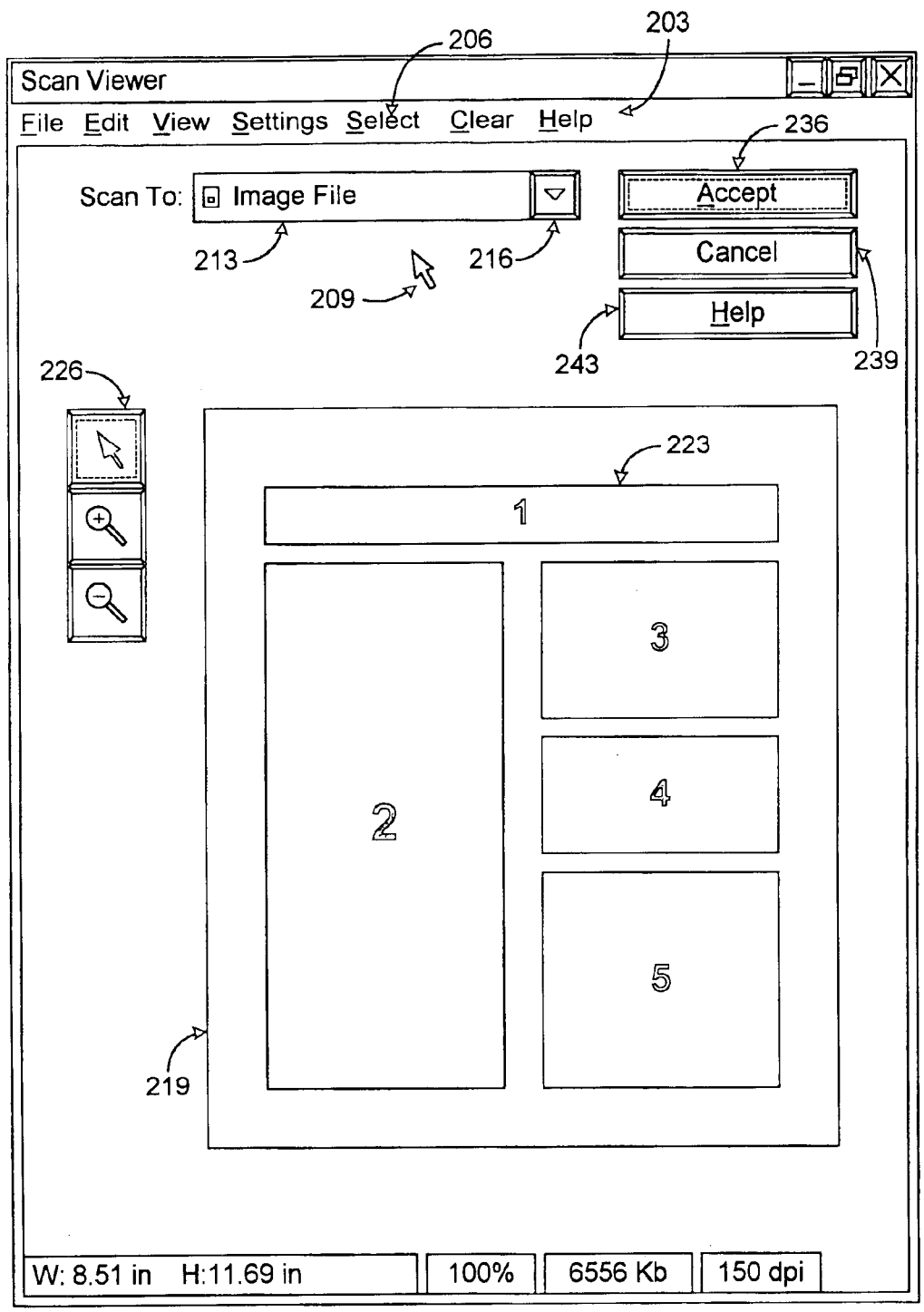
FIG. 2 is a drawing of a first user interface shown on a display screen of the selective document processing system of FIG. 1.

Referring then, to FIG. 2, shown is a first user interface 181a. The first user interface 181a includes a menu bar 203 from which a number of pulldown menus 206 may be accessed. The pulldown menus 206 include File, Edit, View, Settings, Select, Clear, and Help menus, although others may be employed. Each pulldown menu 206 may be accessed by positioning a mouse pointer 209 thereon and "clicking" the mouse 143 (FIG. 1). The term "clicking" the mouse 143 refers to the action of pressing an appropriate button on the mouse 143, thereby providing an input signal to the computer system 103. The simultaneous actions of positioning the mouse pointer 209 on an item on the user interface 181a and clicking the mouse 143 is generally called "clicking on" that item. Note the pulldown menus 206 may be accessed by pressing appropriate buttons on the keyboard 139 (FIG. 1) as well, although generally the use of the mouse 143 is often preferred. In addition, voice commands may be employed to replace the functions of the mouse 143 and keyboard 139 by using predetermined voice commands. Although there may be several options for the user to pursue in each of the pulldown menus 206, only those pertinent to the present invention are discussed herein.

The first user interface 181a also includes a destination application indicator 213. The destination application indicator 213 includes a picklist (not shown) of a number of destination applications that can be accessed by clicking on a picklist button 216 associated with the destination application indicator 213. The destination applications are those software and/or hardware applications with which the selective document processing system 100 interfaces. That is to say, these software and/or hardware applications are the applications to which the information in each of the before identified regions is applied. These may include a word processor, a photo processor, a drawing package, an email package, a publishing package, a document creator, a forms package, a web page maker, databases, operating system clipboards, or other applications. Note that the destination application may also include storage as a file, printing on a printer, transmission by facsimile, or printing via a copier as well. To give a specific example, the text in a region an identified digital document may be applied to a word processor or the like.

The first user interface 181a also displays a digital document 219 that includes at least one region 223. The digital document 219 displayed is that which is identified by the user and is thereafter analyzed and displayed accordingly. The total number of regions 223 shown in FIG. 2 is five, although a greater or lesser number of regions 223 may exist. Note that the regions 223 are numbered from one to five, although in the preferred embodiment, the actual text, artwork, or photos in each region is shown. The regions 223 are identified by performing a document analysis on a specified digital document received from the scanner 149, the external network 153, the mobile data storage 133, or the memory 113. The document analysis identifies the regions 223 by examining the information on the digital document 219 and detecting specific data types thereon. The regions 223 are formed encompassing each area in which the information is of a single data type. There are several data types that can be identified such as, for example, true color photos, grayscale photos, color logos, black & white logos, tables, spot color art, text, page headers, page footers, titles, indexes, tables of contents, and other data types.

The first user interface 181a also includes a region selection button 226 that controls the access to the regions 223. When depressed, the region selection button 226 allows the user to highlight or choose any one or more of the regions 223 by clicking thereon. A highlighted region may be, for example, deleted or altered by the user using the keyboard 139 or the mouse 143. If a region is double clicked, then that region is immediately processed by the processing pipelines as stated previously. The user may also click on the magnify button 229 or the demagnify button 233 in order to zoom in and out on the digital document 223 or a particular region 223 thereon.

The first user interface 18la also includes an accept button 236, a cancel button 239, and a help button 243. The accept button 236 allows the user to apply all highlighted regions 223 to the appropriate processing pipelines. Note the same can be done for a specific region 223 by double clicking on that region 223. When the user clicks on the cancel button 239, the function of the selective document processing system 100 ceases. Clicking on a help button 243 brings forth a help menu to provide aid and operating the selective document processing system 100.

Figure 3:
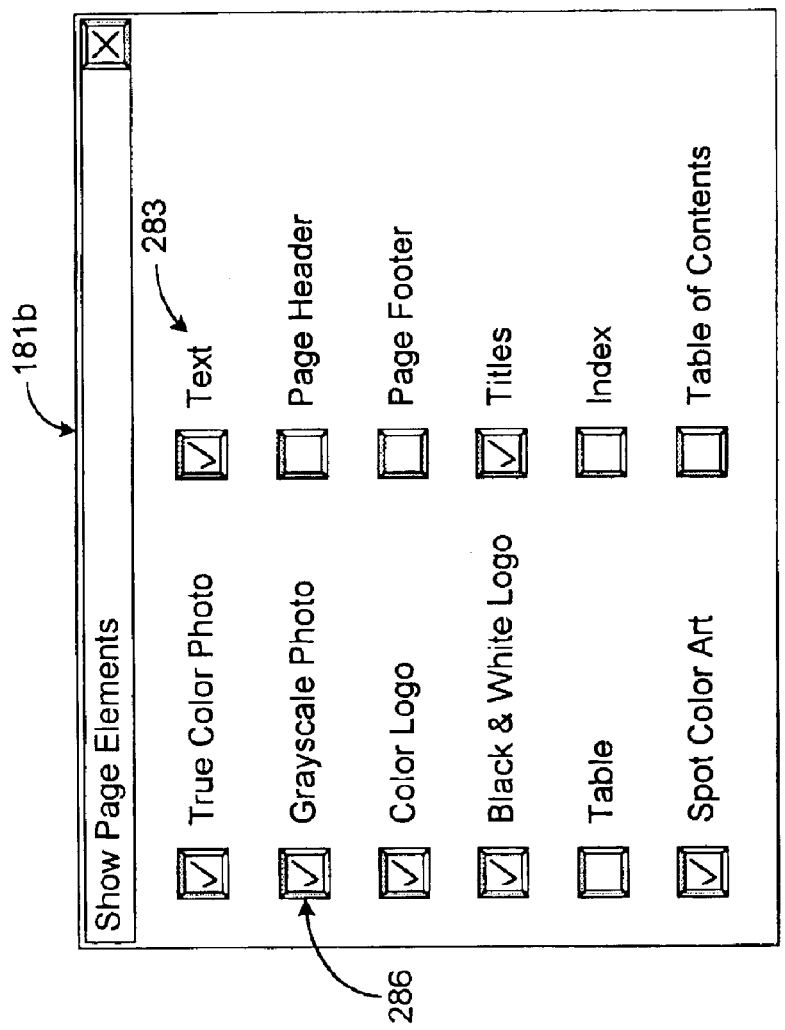
FIG. 3 is a drawing of a selection interface shown on the display screen of the selective document processing system of FIG. 1.

Turning then, to FIG. 3, shown is a selection interface 181b according to another embodiment of the present invention. To the selection interface 181b is displayed on the display device 136 by the clicking a menu item on the settings menu called "page elements". The selection interface 181b provides a list of the various data types 283 that can be identified by the selective document processing system 100. Beside each of the data types 283 is a selection indicator 286. The selection indicator 286 may also be considered a toggle mechanism. As shown, the data types 283 comprise true color photo, grayscale photo, color logo, black and white logo, table, spot color art, text, page header, page footer, titles, index, and table of contents. Note that this list is not intended to be all-inclusive as other nonlisted data types may be included as well. The selection indicator 286 shows a check mark when they particular data type is selected and is blank when they particular data type is not selected. The user can toggle between the selected and not selected states by clicking on the appropriate selection indicator 286 with the mouse 143 (FIG. 1).

The selection interface 181b controls the specific data types 283 that appear in the digital document 219 in the first user interface 181a in that only selected data types 283 appear. In addition, only those selected data types 283 undergo further processing in the processing pipelines and are ultimately applied to a destination application. Thus, the selection interface 181b provides a distinct advantage in that a user can focus on predetermined data types 283 when processing documents on a mass scale by selecting only certain desired data types 283 in the selection interface 181b. The user can thereby minimize the time spent to manually manipulate the digital documents 219 by, for example, selecting multiple regions of the desired data type 283 to be applied individually to the processing pipelines, or collectively applying multiple regions 223 by pressing the accept key 236 (FIG. 2). According to the present invention, a default setting for the selection interface 181b is stored in the memory 113 (FIG. 1) and the selection interface 181b features this setting at startup of the selective document processing system 100.

Reference is now made to FIG. 4 in which a flow chart of the selective processing logic 170 a shown. Beginning with block 303, the digital document 219 (FIG. 2) that is to be processed is identified. This digital document 219 may be identified simply by scanning the document with the scanner 149 which automatically triggers the activation of the selective document processing system 100 for the document scanned. The digital document 219 may also be chosen using a picklist or "open file" option from the file menu (FIG. 1). Once the digital document 219 is identified, the logic 170 progresses to block 306 in which the digital document 219 is analyzed and the various data types 283 thereon are identified and the various regions 223 (FIG. 2) formed by the data types 283 are isolated. Thereafter, the logic 170 progresses to block 309 in which the digital document 219 is displayed including the regions 223 on the first user interface 181a (FIG. 2). As previously mentioned, only the regions 223 that have been selected based on the selection interface 181b (FIG. 3) are displayed on the first user face 181a.

Next, in block 313, the logic 170 determines whether the selection interface 181b has been selected by the user from the settings menu. If the selection interface 181b is selected, then the logic 170 moves to block 316 in which the selection interface 181b is displayed on the display device 136 (FIG. 1). Thereafter the logic 170 progresses to block 319 in which the various data types 283 are selected or deselected based upon the user manipulation of the selection indicators 286 (FIG. 3) as was previously discussed.

However, if in block 313, the selection interface 181b has not been selected by the user from the settings menu, then the logic 170 progresses to block 323 in which it is determined whether the accept button 236 has been depressed (assuming desired regions 223 have been highlighted by clicking thereon), or whether the user has double-clicked on a particular region. If not, the logic 170 reverts back to block 313. If so, then the logic 170 progresses to block 326. In block 326, the appropriate processing pipelines are identified based upon the selected data types in the selection interface 181b and the selected destination application identified in the destination application indicator 213. The pipelines may include, for example, optical character recognition algorithms, raster to vector conversions, processing for color photos, processing for grayscale photos, processing for tables. Thereafter, the logic 170 progresses to block 329 where the selected regions 223 are applied to the identified processing pipelines and processed accordingly. The results are then combined and provided to the identified destination application for further manipulation by the user.

The present invention provides several distinct advantages to the user in analyzing documents. For example, the present invention provides a user with faster and more efficient document processing as unwanted data types need not be examined or manually eliminated by simply selecting only desired data types in the selection interface 181b. This is especially the case for mass document processing in which only specific data types are sought from a number of documents that are consecutively processed. Also, the user is spared the difficulty of viewing a digital document on the first user interface 181b that may be cluttered with unwanted data types. The present invention also allows the user to prevent the creation of data types the destination application will not process such as, for example, unwanted "tables" which may be sent to a photo editor and stored as a photo and not as tables.

In addition, the flow charts of FIG. 4 show the architecture, functionality, and operation of a possible implementation of the selective processing logic 170 (FIG. 1). In this regard, each block represents a module, segment, or portion of code, which comprises one or more executable instructions for implementing the specified logical function(s). It should also be noted that in some alternative implementations, the functions noted in the blocks may occur out of the order noted in FIG. 4. For example, two blocks shown in succession in FIG. 4 may in fact be executed substantially concurrently or the blocks may sometimes be executed in the reverse order, depending upon the functionality involved, as will be further clarified hereinbelow.

The selective processing logic 170, which preferably comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Many variations and modifications may be made to the above-described embodiment(s) of the invention without departing substantially from the spirit and principles of the invention. All such modifications and variations are intended to be included herein within the scope of the present invention.

What is claimed is:

1. A system for controlling document region analysis, comprising:
    a digital document analyzer configured to determine a number of regions on a digital document and a data type for each of the regions, the date type for each region being one of a number of predefined data types;
    a selection interface for selecting at least one of the predefined data types for further processing;
    a processing pipeline identifier configured to identify at least one processing pipeline to process each of the regions comprising one of the predefined data types selected in the selection interface, wherein for each respective one of the regions, the processing pipeline identifier identifies a processing pipeline from a plurality of processing pipelines to process the respective one of the regions based upon the predefined data type of the respective one of the regions, and based upon a predetermined destination application; and
    the processing pipeline identifier being further configured to combine the regions processed by the at least one processing pipeline and to provide the combined regions processed by the at least one processing pipeline to the predetermined destination application.

2. The system of claim 1, wherein the selection interface further comprises a number of toggle mechanisms associated with each of the predefined data types for selecting and deselecting the predefined data types.

3. The system of claim 1, wherein the selection interface further comprises a graphical user interface having a selection indicator for each of the data types.

4. The system of claim 1, further comprising a default selection configuration for each of the data types.

5. The system of claim 1, further comprising a user interface that displays the digital document, wherein only ones of the regions comprising one of the predefined data types selected in the selection interface appear in the displayed version of the digital document.

6. The system of claim 5, wherein the user interface further comprises at least one graphical component that facilitates a selection of ones of the regions appearing in the displayed version of the digital document to be applied to a processing pipeline.

7. A system for controlling document region analysis, comprising:
    analyzing means for analyzing a digital document to determine a number of regions thereon and a data type for each of the regions, the data type for each region being one of a number of predefined data types;
    selection means for selecting at least one of the predefined data types for further processing;
    pipeline identifier means for identifying at least one processing pipeline to process each of the regions comprising one of the predefined data types selected in the selection means, wherein for each respective one of the regions, the pipeline identifier means identifies a processing pipeline from a plurality of processing pipelines to process the respective one of the regions based upon the predefined data type of the respective one of the regions, and based upon a predetermined destination application; and
    the pipeline identifier means further comprising means for combining the regions processed by the at least one processing pipeline and for providing the combined regions processed by the at least one processing pipeline to the predetermined destination application.

8. The system of claim 7, wherein the selection means further comprises means for selecting and deselecting the predefined data types.

9. The system of claim 7, wherein the selection means further comprises a graphical user interface having a selection indicator for each of the data types.

10. The system of claim 7, further comprising a default selection configuration for each of the data types.

11. The system of claim 7, further comprising user interface means for displaying the digital document, wherein only ones of the regions that comprise one of the predefined data types selected using the selection means appear in the displayed digital document.

12. The system of claim 11, wherein the user interface means further comprises means for selecting ones of the regions appearing in the displayed version of the digital document to be applied to a processing pipeline.

13. A method for controlling document region analysis, comprising the steps of:
    analyzing a digital document to determine a number of regions thereon and a data type for each of the regions, the data type for each region being one of a number of predefined data types;
    selecting at least one of the predefined data types for further processing; and
    identifying at least one processing pipeline to process each of the regions comprising one of the predefined data types selected, wherein for each respective one of the regions, a processing pipeline is identified from a plurality of processing pipelines to process the respective one of the regions based upon the predefined data type of the respective one of the regions, and based upon a predetermined destination application;

combining the regions processed by the at least one processing pipeline; and providing the combined regions processed by the at least one processing to the predetermined destination application.

14. The method of claim 13, further comprising the step of deselecting at least one of the predefined data types.

15. The method of claim 13, further comprising displaying a graphical user interface having a selection indicator for each of the data types.

16. The method of claim 13, further comprising identifying a default selection configuration for each of the data types.

17. The method of claim 13, further comprising the step of displaying the digital document in a user interface, wherein only ones of the regions that comprise a selected at least one of the predefined data types appear in the digital document displayed in the user interface.

18. The method of claim 17, further comprising the step of selecting ones of the regions appearing in the displayed version of the digital document to be applied to a processing pipeline.

* * * * *

UNITED STATES PATENT AND TRADEMARK OFFICE
CERTIFICATE OF CORRECTION

| | |
|---|---|
| PATENT NO. | : 6,880,122 B1 |
| APPLICATION NO. | : 09/311254 |
| DATED | : April 12, 2005 |
| INVENTOR(S) | : Jeffrey P Lee et al. |

It is certified that error appears in the above-identified patent and that said Letters Patent is hereby corrected as shown below:

In column 5, line 9, delete "18*la*" and insert -- 181a --, therefor.

In column 7, line 46, in Claim 1, delete "date" and insert -- data --, therefor.

In column 9, line 7, in Claim 13, after "processing" insert -- pipeline --.

Signed and Sealed this

Twelfth Day of May, 2009

JOHN DOLL
*Acting Director of the United States Patent and Trademark Office*